(12) United States Patent
Koopman et al.

(10) Patent No.: US 10,962,972 B2
(45) Date of Patent: Mar. 30, 2021

(54) SAFETY ARCHITECTURE FOR AUTONOMOUS VEHICLES

(71) Applicant: Carnegie Mellon University, Pittsburgh, PA (US)

(72) Inventors: Philip Koopman, Pittsburgh, PA (US); Michael D. Wagner, Pittsburgh, PA (US); Justin Ray, Pittsburgh, PA (US); Aaron Kane, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 210 days.

(21) Appl. No.: 16/068,320

(22) PCT Filed: Jan. 5, 2017

(86) PCT No.: PCT/US2017/012321
§ 371 (c)(1),
(2) Date: Jul. 5, 2018

(87) PCT Pub. No.: WO2017/155598
PCT Pub. Date: Sep. 14, 2017

(65) Prior Publication Data
US 2019/0056735 A1    Feb. 21, 2019

Related U.S. Application Data

(60) Provisional application No. 62/387,804, filed on Jan. 5, 2016.

(51) Int. Cl.
*G05D 1/00* (2006.01)
*G05D 1/02* (2020.01)
*G01C 21/20* (2006.01)

(52) U.S. Cl.
CPC ........... *G05D 1/0077* (2013.01); *G01C 21/20* (2013.01); *G05D 1/0088* (2013.01);
(Continued)

(58) Field of Classification Search
CPC ............ G01C 21/3685; G01C 21/3629; G01C 21/265
(Continued)

(56) References Cited

U.S. PATENT DOCUMENTS 5,613,162 A * 3/1997 Kabenjian ............... G06F 13/28
710/22
6,647,301 B1 * 11/2003 Sederlund .......... G05B 19/0428
700/108
(Continued)

FOREIGN PATENT DOCUMENTS

| JP | S48-061886 | 8/1973 |
| JP | 2008-052473 | 3/2008 |
| WO | WO2017155598 | 9/2017 |

OTHER PUBLICATIONS

International Search Report and Written Opinion dated Nov. 27, 2017 for International Application No. PCT/US2017/012321 filed Jan. 5, 2017 (19 pgs.).
(Continued)

*Primary Examiner* — Jonathan M Dager
*Assistant Examiner* — Jean W Charleston
(74) *Attorney, Agent, or Firm* — Fish & Richardson P.C.

(57) ABSTRACT

A safety architecture system includes, in one aspect, a first stage comprising a primary unit that generates primary data for performing normal system functionality; a secondary unit that generates secondary data for performing alternative system functionality; a primary safety gate coupled to the primary unit, with the primary safety gate providing the primary data as a primary output responsive to a determination of validity of the primary data; and a secondary safety gate coupled to the secondary unit, with the secondary safety gate providing the secondary data as a secondary output responsive to a determination of validity of the secondary data. The system also includes an output selector that is coupled to both the primary safety gate and the secondary safety gate of the first stage, with the output selector
(Continued)

providing a system output responsive to the determinations of the validities of the primary data and the secondary data.

20 Claims, 6 Drawing Sheets

(52) U.S. Cl.
CPC ... *G05D 1/0274* (2013.01); *G05D 2201/0213* (2013.01); *G05D 2201/0216* (2013.01)

(58) Field of Classification Search
USPC .......................................................... 701/25
See application file for complete search history.

(56) References Cited

U.S. PATENT DOCUMENTS

| | | | | |
|---|---|---|---|---|
| 7,954,153 | B2* | 5/2011 | Bancel | G06F 11/28 726/22 |
| 9,934,377 | B2* | 4/2018 | Samat | G06F 13/4022 |
| 2005/0075784 | A1 | 4/2005 | Gray et al. | |
| 2008/0234861 | A1* | 9/2008 | Fortell | G05B 19/41815 700/245 |
| 2009/0292422 | A1* | 11/2009 | Eiswerth | F42B 33/06 701/45 |
| 2015/0280919 | A1* | 10/2015 | Cullen | G05D 1/0077 701/3 |
| 2015/0289091 | A1* | 10/2015 | LV | G06Q 30/0261 455/456.1 |
| 2015/0360684 | A1 | 12/2015 | Matsuno et al. | |
| 2017/0147464 | A1* | 5/2017 | Samat | G06F 11/3051 |

OTHER PUBLICATIONS

Japanese Office Action in JP Appln. No. 2018-535143, dated Dec. 8, 2020, 7 pages (with English translation).

* cited by examiner

SAFETY ARCHITECTURE FOR AUTONOMOUS VEHICLES

CROSS-REFERENCE TO RELATED APPLICATIONS

This application is a § 371 National Stage Application of PCT/US2017/012321, filed Jan. 5, 2017, which claims the benefit of priority under 35 U.S.C. § 119(e) to provisional U.S. Patent Application No. 62/387,804, filed Jan. 5, 2016, the entire contents of each of which are hereby incorporated by reference.

STATEMENT REGARDING FEDERALLY SPONSORED RESEARCH AND DEVELOPMENT

This invention is made with government support under the United States Army Grant Number W900KK-11-C-0025. The government has certain rights in this invention.

BACKGROUND

The complexity of unmanned vehicle software outpaces software-safety engineering techniques available today. Software-safety standards define processes to be employed when creating and validating software. While necessary, the processes prescribed by current standards may not be sufficient to ensure the safety of autonomous software within self-driving vehicles. In some cases, methods for advanced autonomy, such as machine learning, cannot readily be validated using traditional software testing methods. As a result, independent runtime invariant monitors have been used to firewall safety criticality into a small subset of the architecture, thus focusing resource-intensive software-safety engineering techniques away from complex autonomy software and onto much simpler monitoring components. But so far, such techniques have been most successfully deployed to unmanned vehicles that are remote-controlled or teleoperated. To date, it has not been clear how runtime invariant monitors could be most effectively used to mitigate safety risks posed by autonomous functions such as planning and control.

SUMMARY

The present disclosure describes an architecture for autonomous vehicles that incorporates arbitrary autonomy algorithms into a system that upholds strict safety requirements. In this architecture, autonomy components are allowed to fail arbitrarily, even maliciously, while higher-integrity (e.g., higher Safety Integrity Level) "safety gate" components, which might be built without the need for autonomy techniques, uphold safety requirements. A set of architectural stages is created based on a reusable architectural pattern for mapping, planning, and executing safe trajectories. Each stage includes a primary "doer/checker" pair, and an optional secondary "doer/checker" pair to provide a degraded mode of operation in case the primary pair fails. In this disclosure, "doing" means performing autonomous control, while "checking" means confirming that the control signals are safe to execute. If successfully applied, this doer/checker principle may be a suitable option for adoption by safety standards for building dependable systems. In known architectures using the doer/checker architectural pattern, if the doer misbehaves, the checker shuts the entire function down (both modules), resulting in a fail-silent system (i.e., any failure results in a silent component, sometimes also known as fail-stop, or fail-safe in appropriate cases). This may pose a challenge in autonomy systems where it is common to require fail operational system behavior (e.g., an aircraft must keep flying even if there is an autonomy failure). The architecture described in this disclosure addresses this concern by using a multi-channel approach to ensuring continued operation despite one or potentially multiple component failures.

In one aspect, a safety architecture system includes a first stage comprising: a primary unit that generates primary data for performing normal system functionality; a secondary unit that generates secondary data for performing alternative system functionality; a primary safety gate coupled to the primary unit, with the primary safety gate providing the primary data as a primary output responsive to a determination of validity of the primary data; and a secondary safety gate coupled to the secondary unit, with the secondary safety gate providing the secondary data as a secondary output responsive to a determination of validity of the secondary data. The system also includes an output selector that is coupled to both the primary safety gate and the secondary safety gate of the first stage, with the output selector providing a system output responsive to the determinations of the validities of the primary data and the secondary data.

Implementations of the disclosure can include one or more of the following features. The primary safety gate may determine validity of the primary data responsive to a permissive envelope provided by the secondary safety gate. The system may include one or more additional stages comprising a second stage, wherein a primary data output of the second stage provides an input to the primary unit of the first stage, and a secondary data output of the second stage provides an input to the secondary unit of the first stage. The secondary safety gate may determine whether the secondary data was received within a predefined time window to determine whether the secondary data is valid. The secondary safety gate may include a buffer that stores the secondary data in response to the determination the validity of the secondary data. The secondary unit may provide previously stored secondary data as the secondary output responsive to a determination of invalidity of the secondary data. The system output may include control data for operating a vehicle.

In another aspect, a method includes generating, by one or more processors, primary data for performing normal system functionality; generating, by the one or more processors, secondary data for performing alternative system functionality; providing, by the one or more processors, the primary data as a primary output of a first stage responsive to determining validity of the primary data; providing, by the one or more processors, the secondary data as a secondary output of the first stage responsive to determining validity of the secondary data; and providing, by the one or more processors, a system output responsive to determining the validities of the primary data and the secondary data.

Implementations of the disclosure can include one or more of the following features. Determining the validity of the primary data may be responsive to a permissive envelope. Generating the primary data may include receiving a primary input via a primary data output of a second stage; and generating the secondary data may include receiving a secondary input via a secondary data output of a second stage. Determining the validity of the secondary data may include determining that the secondary data was generated within a predefined time window. The method may include storing the secondary data in response to determining the validity of the secondary data. The method may include providing previously stored secondary data as the secondary output of the first stage responsive to determining invalidity of the secondary data. The system output may include control data for operating a vehicle.

In yet another aspect, a system includes a primary planner unit that generates primary path data for moving a device from a first location to a second location; a safing planner unit that generates safing path data for moving the device in presence of one or more adverse conditions during the moving of the device in accordance with the primary path data; a primary planner safety gate that receives the primary path data from the primary planner unit, determines whether the primary path data provides for the moving of the device in accordance with the primary path data in a safe manner, and provides the primary path data as a verified primary path output in response to a determination that the primary path data provides for the moving of the device in accordance with the primary path data in the safe manner; a safing planner safety gate that receives the safing path data from the safing planner unit, determines whether the safing path data provides for the moving of the device so as to avoid the one or more adverse conditions, and provides the safing path data as a verified safing path output in response to a determination that the safing path data provides for the moving of the device so as to avoid the one or more adverse conditions; a primary trajectory executor unit that receives the verified primary path output and generates primary trajectory data from a current waypoint of the device based on the verified primary path output; a safing trajectory executor unit that receives the verified safing path output and generates safing trajectory data from a current waypoint of the device based on the verified safing path output; a primary trajectory safety gate that receives the primary trajectory data from the primary trajectory executor unit, determines whether the primary trajectory data is consistent with a current state of the device, and provides the primary trajectory data as a verified primary trajectory output in response to a determination that the primary trajectory data is consistent with the current state of the device; a safing trajectory safety gate that receives the safing trajectory data from the safing trajectory executor unit, determines whether the safing trajectory data is consistent with the current state of the device, and provides the safing trajectory data as a verified safing trajectory output in response to a determination that the safing trajectory data is consistent with the current state of the device; and a priority selector that is coupled to the primary trajectory safety gate to receive the verified primary trajectory output, to the safing trajectory safety gate to receive the verified safing trajectory output, and to a controller to provide control data, the priority selector provides as the control data one of: the verified primary trajectory output if the verified primary trajectory output is received, the verified safing trajectory output if only the verified safing trajectory output is received, or a default output if neither the verified primary trajectory output nor the verified safing trajectory output is received.

Implementations of the disclosure can include one or more of the following features. The safing trajectory executor unit may generate a permissive envelope that specifies a minimum acceleration rate, a maximum acceleration rate, a minimum deceleration rate, a maximum deceleration rate, a minimum curvature change rate, and a maximum curvature change rate; and the primary trajectory safety gate may determine whether the primary trajectory data is within values specified by the permissive envelope to determine whether the primary trajectory data is consistent with a current state of the device, and may provide the verified primary trajectory output in response to a determination that the primary trajectory data is within the values specified by the permissive envelope. The safing trajectory safety gate may determine whether the safing trajectory data was received within a predefined time window to determine whether the safing trajectory data is consistent with the current state of the device. The safing trajectory safety gate may include a buffer that stores the safing trajectory data in response to a determination that the safing trajectory data is consistent with the current state of the device. The safing trajectory safety gate, in response to a determination that the safing trajectory data is not consistent with the current state of the device, may access previously stored safing trajectory data, may determine whether the previously stored safing trajectory data is consistent with the current state of the device, and may provide the previously stored safing trajectory data as the verified safing trajectory output in response to a determination that the previously stored safing trajectory data is consistent with the current state of the device. The device may include a vehicle and the one or more adverse conditions may include at least one of a condition that prohibits the moving of the vehicle in accordance with the primary path data or a failure of a component of the vehicle that makes the moving of the vehicle in accordance with the primary path data unachievable.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The subject matter described in this specification may be implemented to realize one or more of the following potential advantages. The gap between complex autonomy algorithms and dependable software systems may be bridged by allowing autonomy components to be integrated into a high-dependability framework. Such framework may assure safe system operation even when individual components, such as autonomy components, fail in an arbitrarily bad manner (e.g., both accidental faults and maliciously unsafe behavior by an individual component). Additionally, fail-operational system-level behavior may be provided even when individual components fail or must be shut down due to unsafe component-level behaviors. Heterogeneous functional modules may be provided to reduce the chance of common mode failures, and degraded mode behavior may be provided to, for example, perform a safing mission when primary functionality fails.

The details of one or more implementations are set forth in the accompanying drawings and the description below. While specific implementations are described, other implementations exist that include operations and components different than those illustrated and described below. Other features, objects, and advantages will be apparent from the description, the drawings, and the claims.

DETAILED DESCRIPTION

The present disclosure describes a general-purpose architecture that allows autonomy components with arbitrarily bad failure modes to be integrated into a high-dependability framework. In this architecture, autonomy components are allowed to fail while "safety gate" components uphold safety requirements. While this disclosure describes the architecture in the context of an autonomous ground vehicle (AGV), the architecture is general-purpose for application in any autonomous system including, without limitation, fully autonomous ground vehicles, semi-autonomous ground vehicles, air vehicles, and other robotic systems with complete or partial autonomy.

Figure 1:
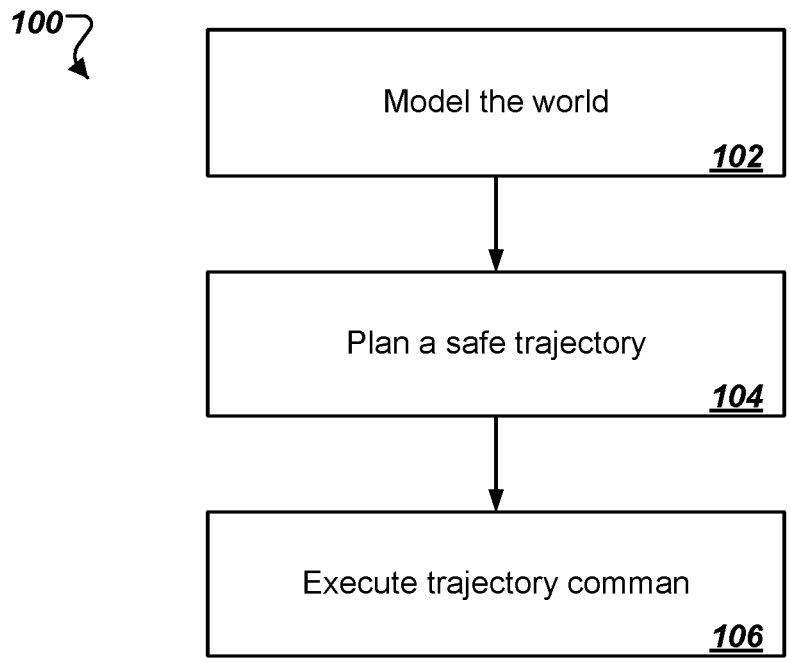
FIG. 1 shows a flowchart of a very high-level, multi-stage description of autonomous capabilities for an autonomous ground vehicle.

By way of example, FIG. 1 is a flowchart 100 summarizing, at a very high level, the capabilities that should be reliably implemented in an AGV. At 102, the AGV builds a model of the surrounding world. The model describes, at some level, information needed to detect safety hazards, including leader vehicles, other traffic, pedestrians, objects on the road, and so on. Models may be built from data from multiple sensors, and may also use prior maps.

At 104, the AGV plans a trajectory through the world that satisfies safety requirements. This may be accomplished using path-planning algorithms. For example, path planners may search for trajectories that avoid obstacles and maintain stability. At 106, the AGV executes this trajectory. Each of these capabilities should be implemented reliably in the AGV's software architecture, and should be backed by claims in its safety case.

This decomposition of autonomous behaviors results in algorithms that each address one of a plurality of stages including models that fuse sensor readings into maps, probabilistic roadmap planners that find a path to a goal on those maps, and path tracking algorithms that execute the path. Because the architecture involves "simple checks" on control outputs, checking may be simpler if done within the limited scope of a single control algorithm. Thus, checking may be simplified by creating a check for each stage of the autonomy system.

The present disclosure describes an architectural pattern that can be instantiated within any autonomy processing stage to make guarantees about the outputs sent to downstream stages. This pattern is suitable across the general category of autonomy functionality and other similar system structures and functions and permits substituting different autonomy algorithms in one stage without disrupting the operation of other stages. A system according to this architecture can have one or more stages. As an example of this pattern, this disclosure describes techniques suitable for the planning and execution stages. The architectural pattern is additionally applicable to non-autonomy applications having a mixture of less-trustworthy components (e.g., off-the-shelf software components) and more trustworthy components (e.g., safety critical components), Applying Reliability Patterns The techniques involve applying proven reliability patterns to reliably plan and execute safe trajectories. Providing redundancy by running the same software on two different computers may be ineffective at mitigating software design faults because there is an expectation that both copies of the software will fail at the same time from the same software defect if such a defect is activated. Such use of diverse software (also known as multi-version programming) require each copy of autonomy software to be safety critical, thus doubling (or more) the cost of developing software compared to a single copy. For autonomy software, how to create even one copy of high integrity software with the requisite functionality may not be known, which may make such an approach infeasible.

Figure 2:
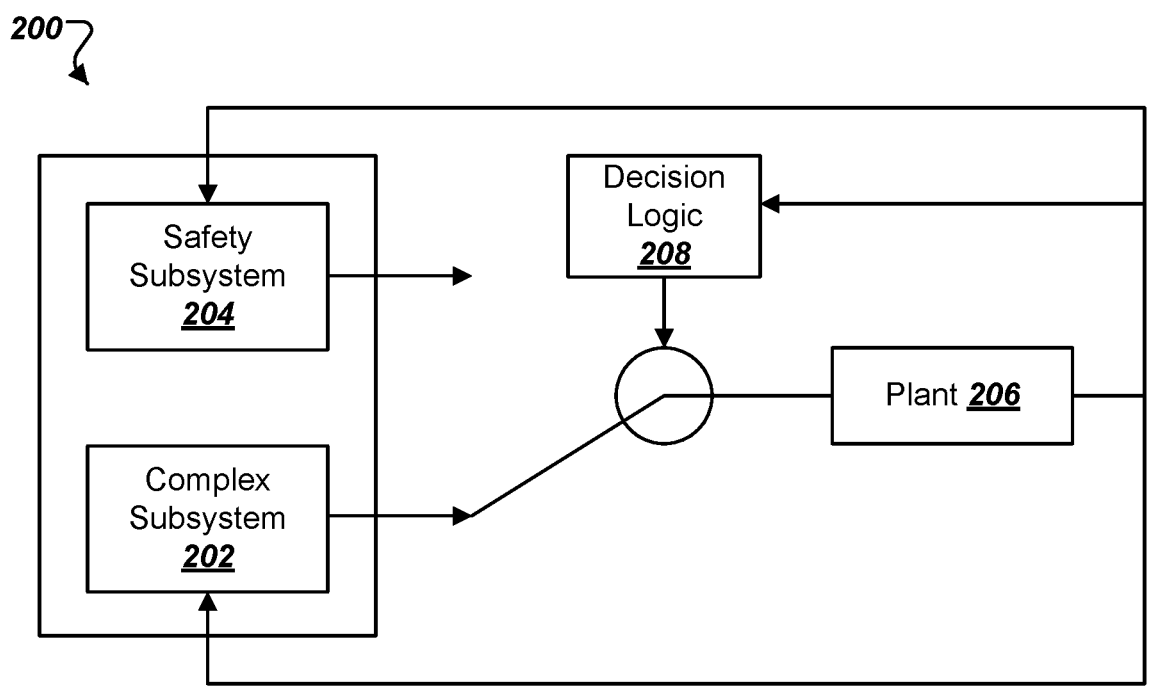
FIG. 2 shows a block diagram of a system for avoiding the need for full-functionality autonomy software to be developed to safety critical standards.

FIG. 2 shows a block diagram of a system 200 for avoiding the need for full-functionality autonomy software to be developed to safety critical standards. The system 200 illustrated in FIG. 2 is known as the Simplex architecture. The Simplex architecture includes two distinct control components: the Complex Subsystem 202 and the Safety Subsystem 204. The Complex Subsystem 202 may be a sophisticated control algorithm that is difficult to develop to a sufficient level of integrity. The Safety Subsystem 204 can provide similar, but simplified control features as the Complex Subsystem 202, but does so using a high-integrity implementation. The high integrity implementation may be much simpler, and therefore less optimized, than the complex implementation. The Safety Subsystem 204 may be a dependable fallback capability if the Complex Subsystem 202 experiences a fault. The Simplex architecture may be used to integrate a high-performance but less-proven technology in a safe manner. In the Simplex architecture, decision logic is responsible for disconnecting the Complex Subsystem 202 from a plant 206 if its outputs could lead to an unsafe system state. When an unsafe condition is predicted, the Safety Subsystem 204 is put in control to avoid an accident.

Correctly implementing the Simplex architecture may provide both performance and reliability in the same architecture, which may be quite valuable. Nominal performance is determined by the complex, high-performance control subsystem 202, while the worst-case performance is bounded by the safety subsystem 204. The scope of costly verification and validation is focused on the safety subsystem 204 and decision logic 208, which, if designed properly, are relatively simple components. Achieving these benefits, however, may require careful design analysis and strict adherence to requirements. In the Simplex architecture there are two doers (safety subsystem 204, complex subsystem 202) and one checker (decision logic 208).

The Simplex architecture has some utility in reliable trajectory planning and execution for an AGV. In an AGV, the Complex Subsystem 202 could use a traditional robotic path-planning algorithm. The Safety Subsystem 204 could be a safe shutdown control subsystem (e.g., bring the vehicle to a stop in a controlled manner). However, design challenges remain.

A remaining design challenge includes determining whether a "safety planner" that meets the requirements of the Safety Subsystem 204 can be feasibly implemented. One example for a leader/follower convoying planner includes a planning system that uses an emergency maneuver library to guarantee that a safe trajectory is always available.

Another remaining design challenge includes designing logic that can determine when to enable the Safety Subsystem 204 (e.g., the Decision Logic 208). This may be challenging because it requires the ability to evaluate the safety of trajectories generated by the Complex Subsystem 202. Moreover, the Decision Logic 208 should be a high-integrity component, since it has the ability to enable/disable the Safety Subsystem's control of the vehicle.

Figure 3:
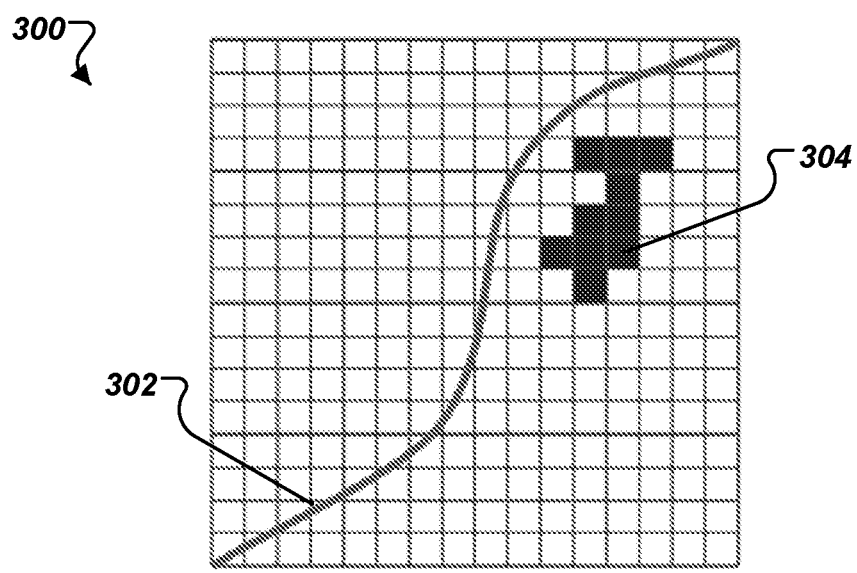
FIG. 3 shows a grid-based binary cost map.

The Decision Logic 208 includes a "trajectory evaluation" component that evaluates the trajectories produced by the Complex Subsystem 202. If the component determines that a trajectory is unsafe, it inhibits the output of the Complex Subsystem 202. The component wraps the Complex Subsystem 202 within a safety gate architecture to make it fail silently upon such determination. The feasibility of implementing such a component involves whether a trajectory-evaluation algorithm can be implemented in a way that is feasible to verify. To do this, the concept that evaluation is simpler than planning can be leveraged. Path planning is a search problem over the vehicle's control space, which may be so large that complex and randomized algorithms should be employed to find practical solutions. By comparison, evaluating the safety of an individual path through this control space is a relatively simple exercise of (i) aligning the commanded trajectory over a grid-based binary cost map (shown as map 300 in FIG. 3), (ii) simulating the traversing of the path (e.g., path 302) through cost map cells, and (iii) if a cell is non-traversable (e.g., intersects the dark cells 304 of the map 300 in FIG. 3), then rejecting the path, and otherwise, accepting it.

For this discussion, the world model is assumed to contain sufficient information to represent all obstacles. An example of a model representation includes a cost map, which is a regular grid encoding the "cost" of traversing a given discrete unit of space in front of the vehicle. A simple cost metric may be the height of objects in a cell above the nominal ground plane, which may be relevant to on-road navigation because the generally flat road surface makes object height an intuitive component of traversability. When traveling over very complex surfaces, such as aggressive off-road navigation, the notion of a "nominal ground plane" can become less helpful, and forward simulation of vehicle motion may be used to evaluate seemingly straightforward traversability characteristics such as effective slope. However, even in benign on-road conditions, sources of error such as sensor calibration can confound simple traversability analysis.

If the Complex Subsystem 202 fails silently (via the decision logic 208 disconnecting the Complex Subsystem 202 when it generates unsafe trajectories), then requirements on the Decision Logic 208 are simplified in that the Safety Subsystem 204 is put in control of the vehicle if a command is not received from the Complex Subsystem 202 within a specified time window. Forcing safety-planner trajectories to terminate in a safe and stopped state can ensure that the trajectories are generated within a limited planning horizon. By limiting the planning horizon, safe trajectory generation can be computationally feasible and can exist entirely within the known configuration space (CSPACE) region local to the vehicle, thus eliminating the possibility of encountering an obstacle beyond sensor range while executing the emergency trajectory controls. Terminating a safety-planner trajectory with a stopped state may be necessary to avoid circumstances where after executing a safety maneuver the vehicle ends in an inevitable collision state—a state where no matter what control action is taken in the future, a collision will occur.

For example, suppose a safety maneuver is generated to swerve past a tree whereby at the end of the maneuver the vehicle has returned to its original velocity. Although the safety maneuver may have successfully avoided the tree, the end state of the maneuver may cause the vehicle to be unable to stop in time to avoid a boulder that was outside the local sensor radius of the vehicle when the maneuver began. A trajectory that does not end in zero velocity may result in the vehicle colliding with the previously unknown boulder.

In the Simplex architecture, the Decision Logic 208 has at least one fail operational component because the complex subsystem 202 provides optimized behavior but is untrusted. The decision logic 208 is ready at any time to switch operation to the safety subsystem 204. Because the decision logic 208 may not detect if the safety subsystem 204 is unsafe, the safety subsystem 204 (which is a "doer" and not a "checker") is high-integrity fail-operational, and the decision logic 208 is also high-integrity. The decision logic 208 can either be fail-operational or fail-safe with "safe" behavior resulting in a switch to the safety subsystem 204. In contrast, the architecture described in this disclosure does not require any of the doers to be fail operational, nor does it require any of the doers to be high integrity.

Architecture Overview

The safety architecture described in this disclosure includes a reusable design pattern which can serve as a basis for the safe control of any robotic or other autonomous or semi-autonomous system, as well as any system that must be built as a composition of high dependability and low dependability components. That pattern provides, among other things, fail-operational system level behavior without requiring any fail operational component blocks, and without requiring any high-integrity doer autonomy blocks. By defining the relationships between classes of objects in a control system, the general problem of safe vehicle navigation and the information requirements and dependencies necessary to implement these concepts in the context of a larger, general autonomy system can be understood. This formalized structure not only facilitates a greater understanding of the problem at hand, but also provides benefits such as unambiguous communication of requirements and improved maintainability through modularization.

Figure 4:
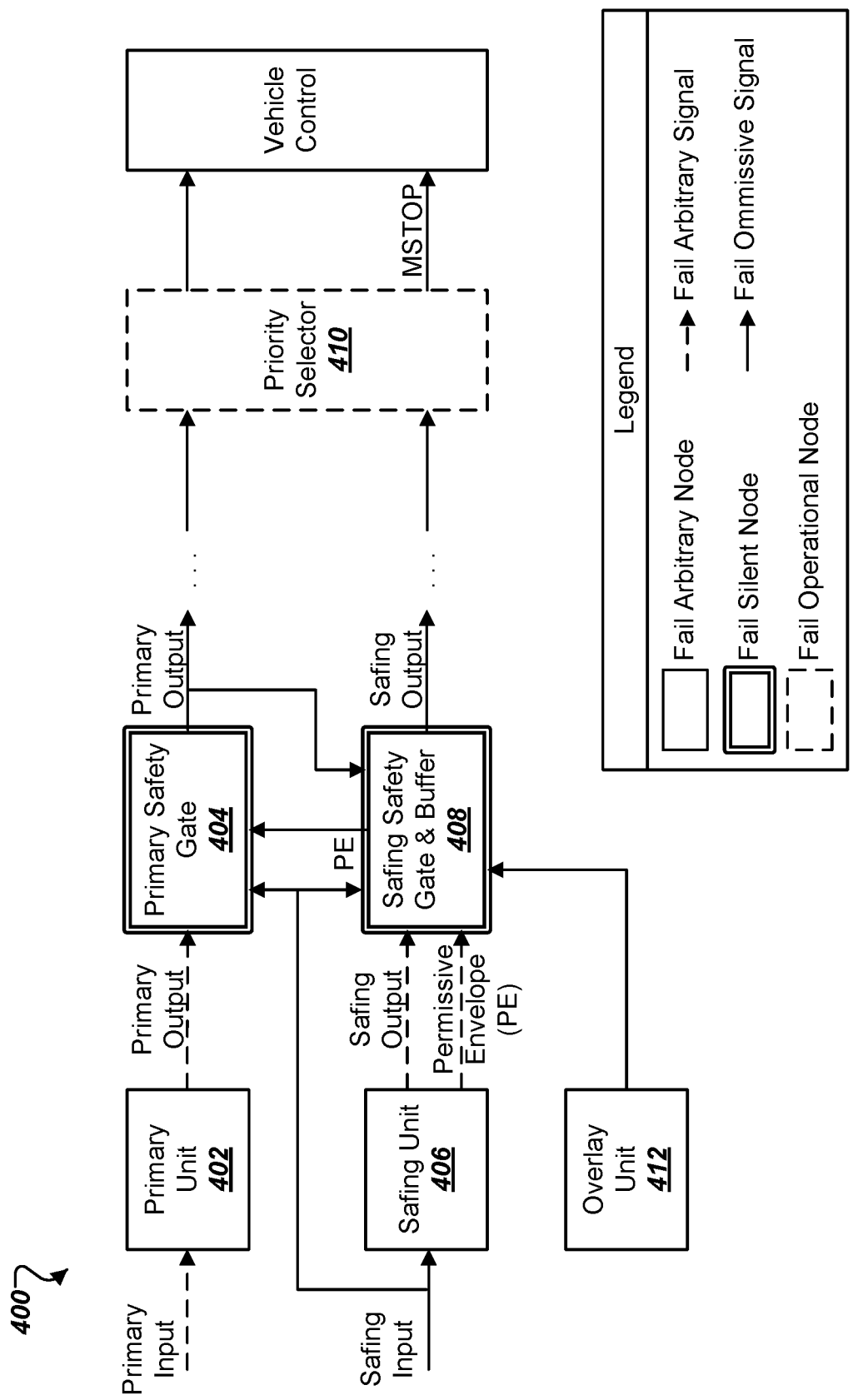
FIG. 4 shows a block diagram of a generalized example of a two-channel version of the safe autonomy architecture.

FIG. 4 is a block diagram showing a generalized example of a two-channel version of the safe autonomy architecture 400. The left portion of the architecture 400 includes a primary unit 402, a primary safety gate 404, a safing unit 406, and a safing safety gate and buffer 408. The left portion of the architecture 400 may be repeated one or more times in a pipeline fashion. The right portion of the architecture 400 includes an optional priority selector 410 for final actuation resolution approach.

The architecture 400 includes "primary" and "safing" channels that are chained together through layers of a system, until at some point a single command output, such as a motor-control command, is provided. The priority selector 410 arbitrates between the channels. If outputs are available from the primary and safing channels, the priority selector 410 transmits the primary channel output. If only a safing channel output is available, the priority selector 410 transmits the safing channel output. In any other case, the priority selector 410 transmits a motion stop ("MSTOP") command, which is a low-level backup means of bringing the vehicle to a stop, such as hitting the brakes and cutting throttle, or deploying a parachute for an aircraft.

A benefit of the architecture 400 stems from the fact that units 402, 406 used to generate outputs in both channels (i.e., the doers) may have low integrity levels, and in fact may each fail arbitrarily. If an unhandled fault occurs in either the Primary Unit 402 or the Safing Unit 406, a properly-instantiated architecture will remain operational and will still meet safety requirements. If both primary and secondary units fail, the system will still remain safe, but downstream stages will be tasked with performing a system recover (e.g., by executing an MSTOP). This obviates the need to certify or completely assure safety from the doer units. In other words, neither the Primary Unit 402 nor the Safing Unit 406 are safety critical, because safety is assured by the corresponding checkers. However, it's important to note that if the Primary or Safing Units are unreliable, the vehicle could suffer availability problems—the architecture 400 will bring the vehicle to a stop or degrade performance by switching to the safing channel more frequently than may be desired.

The two "safety gate" components 404, 408 in the architecture 400 are responsible for checking the outputs of the Primary and Safing Units 402, 406 and failing silently if these outputs are unsafe. These are high integrity components, but may fail silent. The instantiation of safety gates for a particular application may require careful design work; however, in most anticipated cases, this will take far fewer resources (particularly in terms of verification and validation) than developing the Primary and Safing Units 402, 406 to a high level of rigor and integrity. Thus, this approach relaxes the integrity requirements on the doers, and permits the use of fail-stop checkers while still providing a fail-operational overall architecture.

The architecture 400 places stricter requirements on the Priority Selector 410. The Priority Selector 410 must continue to operate in the presence of failures to deliver either a primary or safing command. The Priority Selector 410 may fail silent so long as that failure triggers an MSTOP. This component is simpler than the safety gates, and a great deal of effort can be spent on its verification to achieve the required high level of integrity.

In some implementations, the architecture 400 is time triggered. In a time-triggered architecture, failures are detected through timeouts. Downstream components are not allowed to use "stale" values past some multiple of the message period (to be robust to transient failures). The exception is the Safing Safety Gate & Buffer 408 which may buffer a safing plan, but re-checks the buffered safing plan to see that it is acceptable at every time step. An event triggered approach is also possible, including but not limited to an event-triggered approach that emulates a time-triggered approach via periodic generation of events.

An optional third channel of the architecture 400, called an overlay including the overlay unit 412, allows other equipment to be incorporated into the safety architecture 400. This may include temporary "ground truth" components that, for example, report the position of personnel at a test site so that the architecture 400 can stop the vehicle if they get too close. These components may include appropriate sensors such as a radio beacon sensor. It may also include other equipment (perhaps temporary) that transmits MSTOP commands wirelessly.

Figure 5:
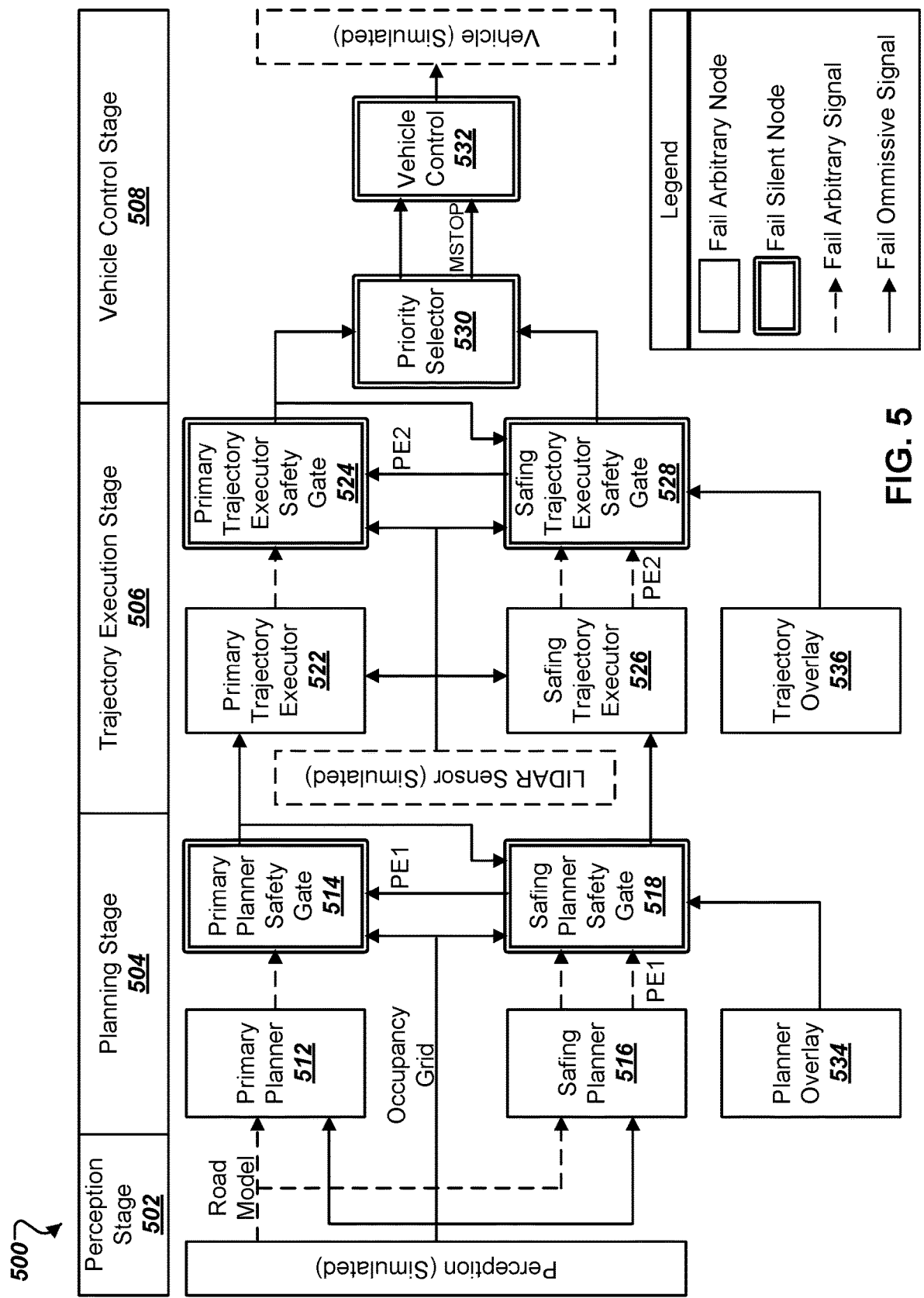
FIG. 5 shows a block diagram of an example of a system instantiation of a safe autonomy architecture.

FIG. 5 is a block diagram showing an example of an AGV system instantiation 500 of the safe autonomy architecture. The architecture has been instantiated for two stages of control: the Planning Stage 504 and the Trajectory Execution Stage 506. Each of these two stages includes primary and safing channels. At the Vehicle Control Stage 508, a Priority Selector 530 is responsible for switching between these channels. The architecture may optionally include an overlay channel that allows other equipment such as Planner Overlay 534 and Trajectory Overlay 536 to be incorporated into the architecture. The architecture may also include dependability concepts to the Perception Stage 502, which generates the maps on which the Planning Stage 504 operates. In some AGV-relevant implementations, communication between the components is accomplished using the Robot Operating System (ROS) as described in Quigley, Morgan, et al., "ROS: an open-source Robot Operating System," ICRA workshop on open source software, Vol. 3, No. 3.2, 2009, the entire contents of which are hereby incorporated by reference. Other communication networks, including Controller Area Networks (ISO 11898), Time Triggered Ethernet (SAE AS6802), or FlexRay (ISO 17458) may be used to integrate the architecture with application specifics.

The Primary Planner

The Primary Planner 512 plans the primary trajectory that the ground vehicle follows under normal operating conditions. Each trajectory produced is collision-free and within the kinematic bounds of the vehicle. This representation is extensible to various realistic limitations on steering, acceleration, braking, and curvature so that the presented framework can be evaluated in the future with additional dynamic complexity. Some AGV-relevant implementations of this architecture uses the Open Motion Planning Library (OMPL) which uses the Robot Operating System (ROS). OMPL is described in Sucan et al., "The Open Motion Planning Library" (PDF), IEEE Robotics & Automation Magazine (December 2011), the entire contents of which are hereby incorporated by reference. Within OMPL, RRT* is used as the planning algorithm. RRT* is described in LaValle, Steven M., "Rapidly-exploring random trees: A new tool for path planning," Technical Report (Computer Science Depai invent, Iowa State University) (TR 98-11) (October 1998), the entire contents of which are hereby incorporated by reference. The Primary Planner 512 receives an occupancy grid from the Perception Stage 502, and plans routes through this grid map. OMPL motion planning is also operable for unmanned aerial vehicle applications.

Handling Arbitrary Failures in the Primary Planner

The output of the Primary Planner 512, which in some AGV-relevant implementations is a trajectory consisting of a sequence of waypoints, is checked by the Primary Planner Safety Gate (PPSG) 514. The PPSG 514 checks whether the Primary Planner's 512 output is valid using an application-specific check, and further checks that the output is within the permissive envelope (PE) provided by the Safing Planner Safety Gate (SPSG) 518. If the Primary Planner's 512 output fails either of these checks, the PPSG 514 simply inhibits the output. Based on the architecture definition, later stages respond by inhibiting their primary channel outputs, and eventually the Priority Selector 530 switches control to the safing channel.

The Primary Planner in AGV Implementations

While start and goal destinations in an operational scenario are defined by a mission description, some AGV-relevant implementation configurations define goals in the SE2 state-space which represents each possible vehicle state according to its (x,y) location in the 2D world (specified by the occupancy grid) as well as its heading ($\theta$). The Primary Planner 512 in the AGV-relevant implementations generates a kinematically feasible path between two points such that the path can actually be followed realistically by a car-like ground vehicle.

The kinematic feasibility of any generated path may be crucial, because the final output from the Vehicle Control 532 is not a geometric path or trajectory, but a sequence of controls that can be applied to an actual ground vehicle to cause it to follow the solution trajectory. In order to solve this problem the system 500 splits the problem into two separate phases: trajectory generation (producing the path that will be followed by the vehicle) and control generation (generating the sequence of controls that will cause the vehicle to follow the generated trajectory).

During the trajectory generation phase, the paths produced are able to transition a vehicle from start to goal without violating the collision constraints (imposed by the occupancy grid) or kinematic constraints (as imposed by the vehicle model). By considering these constraints during the generation phase, controls are generated for the vehicle such that it is able to follow the solution trajectory. To generate the controls, a state-space implementation called "Dubin's car" is used which is a simple kinematic model of a car or truck only allowing the vehicle to move in ways possible for an on-road vehicle. This model limits the vehicle's movement to only three possible ways: turn right arc, turn left arc, and go straight. By constructing trajectories using sequences of these motion primitives, controls to follow the trajectory are generated during the control generation phase given a path that satisfies these constraints (assuming the turning radius matches the physical vehicle). By instantiating OMPL with the Occupancy Grid based validity checker and the Dubins motion constraint, trajectories may be generated that are both feasible and collision-free.

Figure 6:
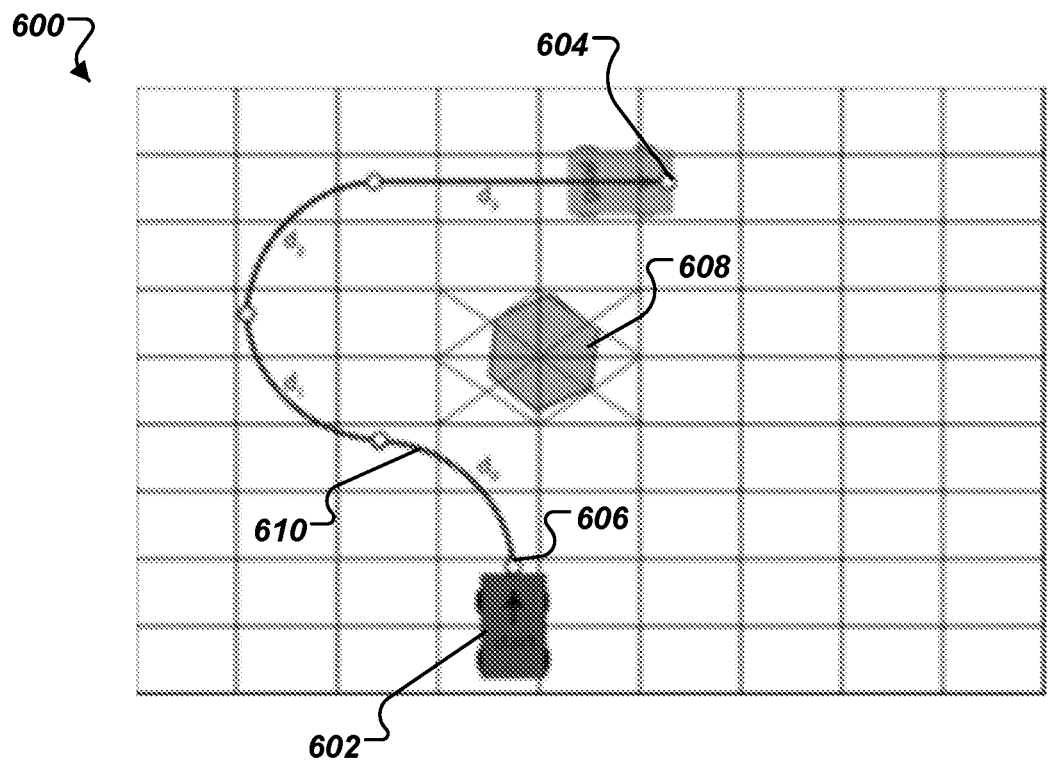
FIG. 6 shows a diagram of an example of an occupancy grid for motion planning.

FIG. 6 is a diagram showing an example of an occupancy grid 600 for motion planning with a Dubin's car kinetic model using OMPL. In FIG. 6, a vehicle 602 attempts to achieve a desired goal state 604 from its current location 606. The vehicle 602 is to achieve the desired goal state 604 while avoiding an obstacle 608. The presence of the obstacle 608 causes the relevant squares of the occupancy grid 600 to be marked as "occupied" thus preventing the vehicle 602 from traveling through these squares. As shown in FIG. 6, the vehicle 602 turns left at the obstacle 608 instead of right, even though the goal location 604 is closer to the right side of the obstacle 608. If the vehicle 602 were to turn right then left, it would be facing the wrong direction and thus would not satisfy the desired heading described by the goal. Since turning around after going right at the obstacle 608 is more costly than going left initially, the vehicle 602 plans the trajectory 610 to the left. The solution trajectory 610 cannot cut closely along the occupied squares of the obstacle 608 because the turning radius limitations on the vehicle 602 prevent the construction of arcs that are too tight. Since this turning radius is a configurable parameter, the underlying trajectory generation method may be tested with varying vehicle types. As discussed previously, the OMPL planning library may be used to produce motion plans. OMPL includes a Dubin's state space representation which may be used to initialize the OMPL Planner class along with a custom "Validity Checker".

The Safing Planner

Referring again to FIG. 5, given the existing world and vehicle state, the Safing Planner 516 in AGV-relevant implementations produces feasible trajectories designed to enable the vehicle to stop quickly and safely when problems occur. The Safing Planner 516 provides an emergency option for the vehicle and continually reevaluates the plans as the vehicle moves through the world and as a dynamic or static obstacle is encountered.

Handling Arbitrary Failures in the Safing Planner

Although the above requirements are desired for the Safing Planner 516, the system does not depend on the Safing Planner 516 to guarantee vehicle safety. The Safing Planner 516 is marked as a "fail arbitrary" block, just like the Primary Planner 512. The system achieves this with the following features:

1. The outputs of the Safing Planner 516 are evaluated by the Safing Planner Safety Gate 518, which, for example, inhibits its output if the safing plan would collide with an obstacle.
2. The Safing Planner 516 also produces a Permissive Envelope (PE) against which the Primary Planner's 512 outputs are checked (described in more detail below). The Safing Planner Safety Gate 514 also evaluates whether this envelope is itself appropriate.
3. After the Primary Planner 512 fails, the Safing Planner 516 is put in control; however, the Safing Planner Safety Gate 518 gives the Safing Planner 516 a limited time window in which to bring the vehicle to a stop. After that time window expires, the Safing Planner Safety Gate 518 inhibits its outputs. In response to a lack of outputs from either Primary or Safing Channels, the Priority Selector 530 triggers an MSTOP.

The Safing Planner in AGV Implementations

As mentioned above with respect to the Primary Planner 512, there may be some adverse circumstances or conditions where a ground vehicle may be unable to achieve its desired planned path. This could be due to an invalid mission specification, a hardware failure making the planned path unachievable, or various other dynamic circumstances such as an obstacle, a traffic delay, and a construction delay not considered in the original plan. To provide safe vehicle operation during these events, the system includes a separate path-planning component (e.g., the Safing Planner 516) for producing paths that direct the vehicle from its current state to a safe goal state where the vehicle is stopped. By forcing the vehicle to come to a stop, the failed vehicle remains in its goal state safely for an indefinite period of time. An analogous operation for an aircraft would be a diversion to closest landing area. Since the goal of the Safing Planner 516 is to come to a stop safely, the Safing Planner 516 considers multiple different goal configurations to find a safe stopping path. The Safing Planner 516 finds a safe stopping path as follows:

1. Plan a trajectory to apply maximum braking, bringing the vehicle to a stop at the side of the road.
2. If the vehicle cannot stop along the side of the road, attempt to achieve a safe goal state with the minimum amount of deviation from the original trajectory.
3. If the the vehicle still cannot achieve a safe trajectory, increment the allowable amount of heading deviation and attempt to replan.
4. Repeat until the maximum steering angle is reached, or a safe trajectory has been generated.

Since the Safing Planner 516 should always be prepared for a potential failure, each time the map or vehicle state information is updated, the Safing Planner 516 initiates a new search for a safe stopping trajectory. In some AGV implementations, the Safing Planner 516 performs this search over a fixed set of trajectories, again accomplished with the Robot Operating System (ROS). The Safing Planner 516 receives an occupancy grid from the Perception Stage 502, and plans routes through this grid map. If the Safing Planner 516 cannot generate a new safe plan, it signals the system to initiate the last generated safe trajectory because traveling without an emergency option is inherently unsafe.

Figure 7:
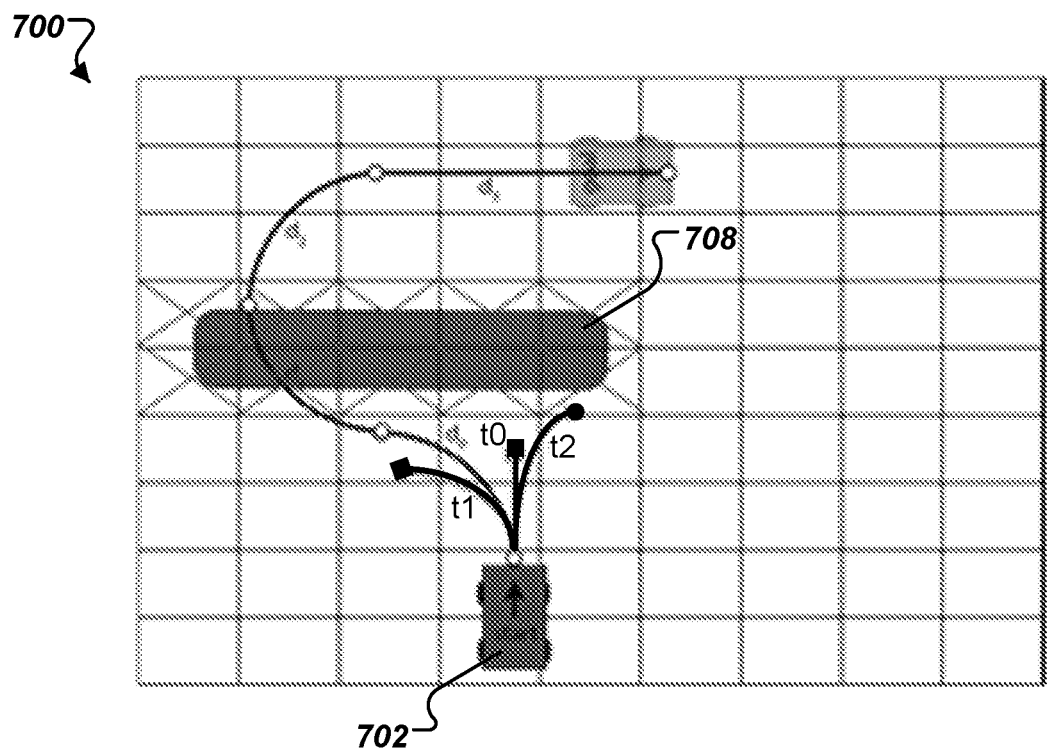
FIG. 7 shows a diagram of an example of an occupancy grid for motion planning in reaction to a falling tree.

FIG. 7 is a diagram showing an example of an occupancy grid 700 for motion planning in reaction to a falling tree. Suppose that the obstacle 608 in FIG. 6 is a large tree. After creating the trajectory 610 as shown in FIG. 6, the tree falls in the intended path. This change updates the state of the map as indicated in grid 700 of FIG. 7, and therefore triggers the Safing Planner 516 (in FIG. 5) to generate three emergency trajectories (t0, t1 and t2). Since the safe stopping trajectory t0 does not collide with the obstacle 708, trajectory t0 is selected and immediately applied. However, if the vehicle 702 is too large to stop in the time calculated for trajectory t0, trajectory t2 is invalidated by the obstacle 708 and is therefore not considered. In this situation, the vehicle 702 selects the safe alternative trajectory t1 instead. Because the vehicle 702 was already beginning its left turn, it may be able to construct a sharper turn away from the obstacle 708 to the left rather than to the right. Thus, consideration of the state of the ground vehicle 702 may be crucial in the generation of these safing paths.

Permissive Envelopes

Referring again to FIG. 5, a permissive envelope PE1 is used to confirm that the output of the Safing Planner 516 will still be achievable if the vehicle begins executing the outputs of the Primary Planner 512. This is important because if a fault were to occur, the system 500 would switch from Primary to Safing outputs. PE1 is generated by the Safing Planner 516 along with the safing plan. The safety of PE1 is checked by the Safing Planner Safety Gate 518. If PE1 passes this check, it is passed on to the Primary Planner Safety Gate 514. The Primary Planner Safety Gate 514 uses PE1 as part of the criteria for accepting or rejecting the Primary Planner's 512 output. Permissive envelopes, both in general and in the specific context of an example of an AGV trajectory-execution stage, are further described below.

The Primary Safety Gate

Referring to FIG. 4, the purpose of the Primary Safety Gate (PSG) 404 is to inhibit unsafe inputs from the Primary Unit 402. As described below, the output of the Primary Unit 402 is checked for inherent safety (e.g., in the context of the AGV Planning Stage 504 of FIG. 5, whether the plan collides with obstacles or violates dynamics constraints), and then also checked for compatibility with the permissive envelope generated by the Safing Unit 406. If the PSG 404 inhibits the outputs of the Primary Unit 402, the time-triggered Priority Selector 410 switches to sending outputs from the Safing Unit 406 to vehicle actuators.

Referring to FIG. 5 in the context of the AGV Planning Stage 504, the Primary Planner Safety Gate 514 is implemented as a node in the Robot Operating System, which receives an occupancy grid from the Perception Stage 502 as well as the output of the Primary Planner 512 and a permissive envelope. The Primary Planner Safety Gate 514 iterates through the waypoints specified in the Primary Planner's 512 output and determines whether the output would cause the vehicle to collide with any obstacles in the grid, or whether it would violate the permissive envelope.

The Safing Safety Gate

Referring to FIG. 4, the Safing Safety Gate (SSG) 408 performs similar checks on the outputs of the Safing Unit 406, which is allowed to fail arbitrarily. If the output of the Safing Unit 406 collides with an obstacle or violates dynamics constraints, then that output is inhibited. The SSG 408 maintains a buffer holding the last output of the Safing Unit 406 that passes these checks. When an incoming plan is safe, the SSG 408 writes the incoming plan into the buffer. But if the incoming plan is not safe, the SSG 408 discards the incoming plan and continues executing the buffered plan. The SSG 408 inhibits its outputs within a time window, unless a new, safe plan is received from the Safing Unit 406. If the SSG 408 inhibits its outputs, the time-triggered Priority Selector 410 triggers an MSTOP.

Referring to FIG. 5 in the context of the AGV Planning Stage 504, the Safing Planner Safety Gate 518 is implemented as a node in the Robot Operating System, which receives an occupancy grid from the Perception Stage 502 as well as the output of the Safing Planner 516. The Safing Planner Safety Gate 518 iterates through the waypoints specified in the Safing Planner's 516 output and determines whether the output would cause the vehicle to collide with any obstacles in the grid.

The Priority Selector

Referring to FIG. 4, a Priority Selector 410 selects between the Primary and Safing Outputs, typically at the final stage of the architecture. For example, the Priority Selector 410 may decide which trajectory commands to send to the vehicle actuators. The logic of the Priority Selector 410 is such that if the Primary Output is inhibited, then the Safing Output is transmitted. If the Safing Output is inhibited, then an MSTOP is triggered. The Priority Selector 410 assumes that the safety gates 404, 408 fail silently.

Referring to FIG. 5 in the context of AGV system implementations, the Priority Selector 530 is instantiated at the output of the Trajectory Execution Stage 506. The Priority Selector 530 is implemented as a node in the Robot Operating System (ROS) and receives the outputs of both the Primary Trajectory Executor Safety Gate 524 and the Safing Trajectory Executor Safety Gate 528 within the Trajectory Execution Stage 506. The outputs of the Priority Selector 530 includes vehicle velocity and curvature commands, which are translated by another ROS node, known as the Vehicle Controller 532, into commands to the vehicle's braking, steering, and throttle actuators.

The Trajectory Execution Stage

A waypoint $P_i$ is a two-dimensional position with a heading, i.e., $\{x_i, y_i, theta_i\}$. A trajectory $\{V_i, C_i\}$ is a speed-curvature pair with an implicit duration based on the time-triggered period. The current system state (e.g., vehicle pose, etc.) is $S_i$. For the Trajectory Execution Stage 506, the permissive envelope PE2 is a range limit for the acceleration and yaw with the safing trajectory. PE2 is provided as a list of minimum and maximum accelerations and yaw rates $\{\Delta V^{min}_i, \Delta V^{max}_i, \Delta C^{min}_i, \Delta C^{max}_i\}$.

The Primary Trajectory Executor 522 and Safing Trajectory Executor 526 are the nodes which run the primary trajectory algorithms (Algorithm 1) pta and the safing trajectory algorithms (Algorithm 2) sta, respectively. They both take a waypoint $P_i$ and the current vehicle state $S_i$ and output a trajectory from the current position of the waypoint.

| Algorithm 1: Primary Trajectory Executor | |
|---|---|
| Input: | A waypoint $PW_i : (x_i, y_i, \theta_i)$ |
| | The system state $S_i$ |
| Output: | A trajectory $\{V_i, C_i\}$ |
| 1   $\{V_i, C_i\} \leftarrow $ pta$(PW_i, S_i)$ ; | |

| Algorithm 2: Safing Trajectory Executor | |
|---|---|
| Input: | A waypoint $SW_i : (x_i, y_i, \theta_i)$ |
| | The system state $S_i$ |
| Output: | A trajectory $\{V_i^a, C_i^a\}$ |
| | The safing envelope $\{\Delta V_i^{min}, \Delta V_i^{max}, \Delta C_i^{min}, \Delta C_i^{max}\}$ |

-continued

| Algorithm 2: Safing Trajectory Executor |
|---|
| 1    $\{V_i^a, C_i^a\} \leftarrow sta(SW_i, S_i)$ ; |
| 2    $\Delta V_i^{min} \leftarrow V_b^a + \Delta V_r^{min}$ ; |
| 3    $\Delta V_i^{max} \leftarrow V_b^a + \Delta V_r^{max}$ ; |
| 4    $\Delta C_i^{min} \leftarrow C_b^a + \Delta C_r^{min}$ ; |
| 5    $\Delta C_i^{max} \leftarrow C_b^a + \Delta C_r^{max}$ ; |

The Primary Trajectory Executor Safety Gate 524 runs Algorithm 3, which checks the primary trajectory against the current state and PE2 created by the Safing Trajectory Executor Safety Gate 528. If the trajectory is consistent with the current state and within PE2's limits, the primary trajectory is passed through the Primary Trajectory Executor Safety Gate 524.

| Algorithm 3: Primary Safety Gate | |
|---|---|
| Input: | The primary trajectory $\{V_i, C_i\}$ |
| | The system state $S_i$ |
| | The safing envelope $\{\Delta V_i^{min}, \Delta V_i^{max}, \Delta C_i^{min}, \Delta C_i^{max}\}$ |
| Output: | The primary trajectory $\{V_i, C_i\}$ |
| 1   pte_ok $\leftarrow$ psg_check($V_i, C_i, S_i$) ; | |
| 2   if pte_ok and $\Delta V_i^{min} \leq V_i \leq \Delta V_i^{max}$ and $\Delta C_i^{min} \leq C_i \leq \Delta C_i^{max}$ then | |
| 3      | pass $\{V_i, C_i\}$ | |
| 4   end | |

The Safing Trajectory Executor Safety Gate 528 is a node that runs Algorithm 4 to check the trajectory from the Safing Trajectory Executor 526 and passes either the new incoming safing trajectory or an old buffered safing trajectory. The Safing Trajectory Executor Safety Gate 528 also creates PE2 which the Primary Trajectory Executor Safety Gate 524 uses to ensure that the primary trajectory is consistent with the current safing trajectory. PE2 is generated by creating an "envelope" of allowable accelerations and curvature changes based on the current safing trajectory values and a set of constant recoverability limits $\{\Delta V_r^{min}, \Delta V_r^{max}, \Delta C_r^{min}, \Delta C_r^{max}\}$.

| Algorithm 4: Safing Safety Gate | |
|---|---|
| Input: | The safing trajectory $\{V_i^a, C_i^a\}$ |
| | The system state $S_i$ |
| | The safing envelope $\{\Delta V_i^{min}, \Delta V_i^{max}, \Delta C_i^{min}, \Delta C_i^{max}\}$ |
| Output: | The safing trajectory $\{V_i^a, C_i^a\}$ |
| | The safing envelope $\{\Delta V_i^{min}, \Delta V_i^{max}, \Delta C_i^{min}, \Delta C_i^{max}\}$ |
| 1   if ssg_check($V_i^a, C_i^a, S_i$) then | |
| 2     | $V_b^a \leftarrow V_i^a$ ; | |
| 3     | $C_b^a \leftarrow C_i^a$ ; | |
| 4     | $\varepsilon_b \leftarrow \{\Delta V_i^{min}, \Delta V_i^{max}, \Delta C_i^{min}, \Delta C_i^{max}\}$ ; | |
| 5   end | |
| 6   if ssg_check($V_b^a, C_b^a, S_i$) then | |
| 7     | pass $\{V_b^a, C_b^a\}$ ; | |
| 8     | pass $\varepsilon_b$ ; | |
| 9   end | |

Generalized Algorithms

Algorithms 1 through 4 are expressed below in a generalized fashion rather than in the context of trajectory execution. The Primary Algorithm (Algorithm 5) produces some output $O_i$, the details of which are layer-specific. No requirements are placed on the correctness of the Primary Algorithm; it may fail in arbitrary ways.

| Algorithm 5: Primary Algorithm | |
|---|---|
| Input: | An Input $I_i$ |
| | The system state $S_i$ |
| Output: | An Output $O_i$ |
| 1   $O_i \leftarrow$ primAlg($I_i, S_i$) ; | |

The Safing Algorithm (Algorithm 6) is responsible for its own output $O_i^S$ along with a permissive envelope $E_i$.

| Algorithm 6: Safing Algorithm | |
|---|---|
| Input: | An Input $I_i^a$ |
| | The system state $S_i$ |
| Output: | An Output $O_i^a$ ; |
| | The safing envelope $\varepsilon_i$ |
| 1   $O_i^a \leftarrow$ safeAlg($I_i^a, S_i$) ; | |
| 2   $\varepsilon_i \leftarrow$ genEnv($O_i^a$) | |

The Primary Safety Gate (Algorithm 7) is responsible for two types of checks. First, it runs an application-specific function psg_check, which ensures that the output of the Primary Algorithm is acceptable given the current system state $S_i$. The PSG is also responsible for ensuring that the output of the Primary Algorithm lies within the permissive envelope.

| Algorithm 7: Primary Safety Gate | |
|---|---|
| Input: | The primary Output $O_i$ |
| | The system state $S_i$ |
| | The safing envelope $\varepsilon_i$ |
| Output: | The primary Output $O_i$ |
| 1   pte_ok $\leftarrow$ psg_check($O_i, S_i$) ; | |
| 2   if pte_ok and $O_i \in \varepsilon_i$ then | |
| 3     | pass $O_i$ | |
| 4   end | |

The Safing Safety Gate is shown in Algorithm 8, which defines the buffering logic described earlier in the "Safing Safety Gate" section. Note that the ssg_check( . . . ) function also checks the age of the safing trajectory and permissive envelope; if either of these is older than a specified timeout period, then ssg_check( . . . ) returns false.

| Algorithm 8: Safing Safety Gate | |
|---|---|
| Input: | The safing trajectory $O_i^a$ |
| | The safing envelope $\varepsilon_i$ |
| | The system state $S_i$ |
| Output: | The safing trajectory $O_i^a$ |
| | The safing envelope $\varepsilon_i$ |
| 1   if ssg_check($O_i^a, \varepsilon_i, S_i$) then | |
| 2     | $O_b^a \leftarrow O_i^a$; | |
| 3     | $\varepsilon_b \leftarrow \varepsilon_i$ ; | |
| 4   end | |
| 5   if ssg_check($O_b^a, \varepsilon_b, S_i$) then | |
| 6     | pass $O_b^a$ ; | |
| 7     | send $\varepsilon_b$ ; | |
| 8   end | |

The safety case of an AGV implementation rests on Safety Gates that evaluate vehicle trajectories for collisions against an obstacle map. Given a map and a trajectory, a Safety Gate reports whether the given trajectory is safe or unsafe on the given map. The Safety Gate checks a moderately high-dimensionality trajectory against a moderately high-dimensionality map using continuous, transcendental dynamics. A trajectory is translated into a path (series of positions) based on a set of dynamics equations, and these positions are checked against the map to decide if the trajectory is safe or not. The definition of a safe trajectory for purposes of the present disclosure is one that does not intersect with an obstacle on the map using kinematics equations. A Safety Gate calculates positions to a certain accuracy and resolution based on the trajectories and reports a safety problem when one of these positions overlaps an obstacle.

the planning stage is informed. Additionally, although the described safety architecture includes different stages appropriate for such architecture, many robotics architectures segregate "sensing", "thinking", and "acting" into stages, and the safety architecture take a similar approach.

The following chart lists examples of conditions and behaviors of the system which may satisfy the requirement that the vehicle not collide with obstacles.

| | Condition | Behavior |
|---|---|---|
| 1 | No processes crash | The vehicle properly avoids simulated obstacles. |
| | Planning Stage | |
| 2 | Primary Planner malfunctions | The vehicle starts executing safing plans, coming to a stop at the side of the road. |
| 3 | Safing Planner malfunctions | The vehicle executes the last good safing plan received by the Safing Planner Safety Gate, coming to a stop at the side of the road. |
| 4 | Primary Planner Safety Gate (PPSG) crashes | Same behavior as Condition 2. |
| 5 | Safing Planner Safety Gate (SPSG) crashes | Killing the SPSG inhibits both primary and safing plans. The trajectory stage gets no inputs, and thus sends no outputs, which causes the Trajectory Execution Stage to execute a safing trajectory. |
| | Trajectory Execution Stage | |
| 6 | Primary Trajectory Executor malfunctions | The vehicle starts executing plans from the Safing Planner. In this example implementation, the Safing Planner is not notified of the failure in the trajectory stage, so it continues submitting plans. At the end of a timeout period, the Safing Trajectory Safety Gate stops transmitting commands. At this point neither the primary nor the safing channels in the trajectory stage transmit commands. In response the Priority Selector executes a MSTOP command for the vehicle. While this meets safety requirements, execution of the MSTOP command would not have been necessary with an alternate embodiment in which the Safing Planner is notified of a Primary Trajectory Executor malfunction so that the Safing channel can bring the vehicle to a controlled stop. |
| 7 | Safing Trajectory Executor malfunctions | The trajectory layer does not deal with long-duration commands; instead it calculates vehicle actuator commands based on the longer plan. So when the Safing Trajectory Executor fails, the Safing Trajectory Safety Gate executes the last valid safing trajectory in the buffer. If no valid safing trajectory is available, the Safing Trajectory Safety Gate times out, causing both primary and safing channels to go silent. This, in turn, causes the Priority Selector to execute a MSTOP command. |
| 8 | Primary Trajectory Safety Gate (PTSG) crashes | When the PTSG crashes, the STSG also inhibits outputs. In response the Priority Selector executes a MSTOP command for the vehicle. While this meets safety requirements, the MSTOP command is not necessary because the safing channel is still valid. The STSG causes the Priority Selector to execute a MSTOP command for the vehicle after some timeout period, during which the safing channels in the planning and trajectory stages brings the vehicle to a stop. |
| 9 | Safing Trajectory Safety Gate (STSG) crashes | Crashing the STSG inhibits both outputs, with causes the Priority Selector to execute a MSTOP command. |

The system described in this disclosure includes a hybrid model of the entire architecture which avoids collisions. The hybrid system follows the primary provider's trajectories or a safing trajectory, and provides a safe execution. The safety gate "checker" portions of the architecture may be created as high integrity components by following software safety standards known in the art, such as ISO 26262, IEC 61508, MIL-STD 882E, and other relevant standards. A timeout mechanism may be used to check that the safing plan brings the vehicle to a stop within the required period of time, because the Safing Unit could fail arbitrarily.

Figure 8:
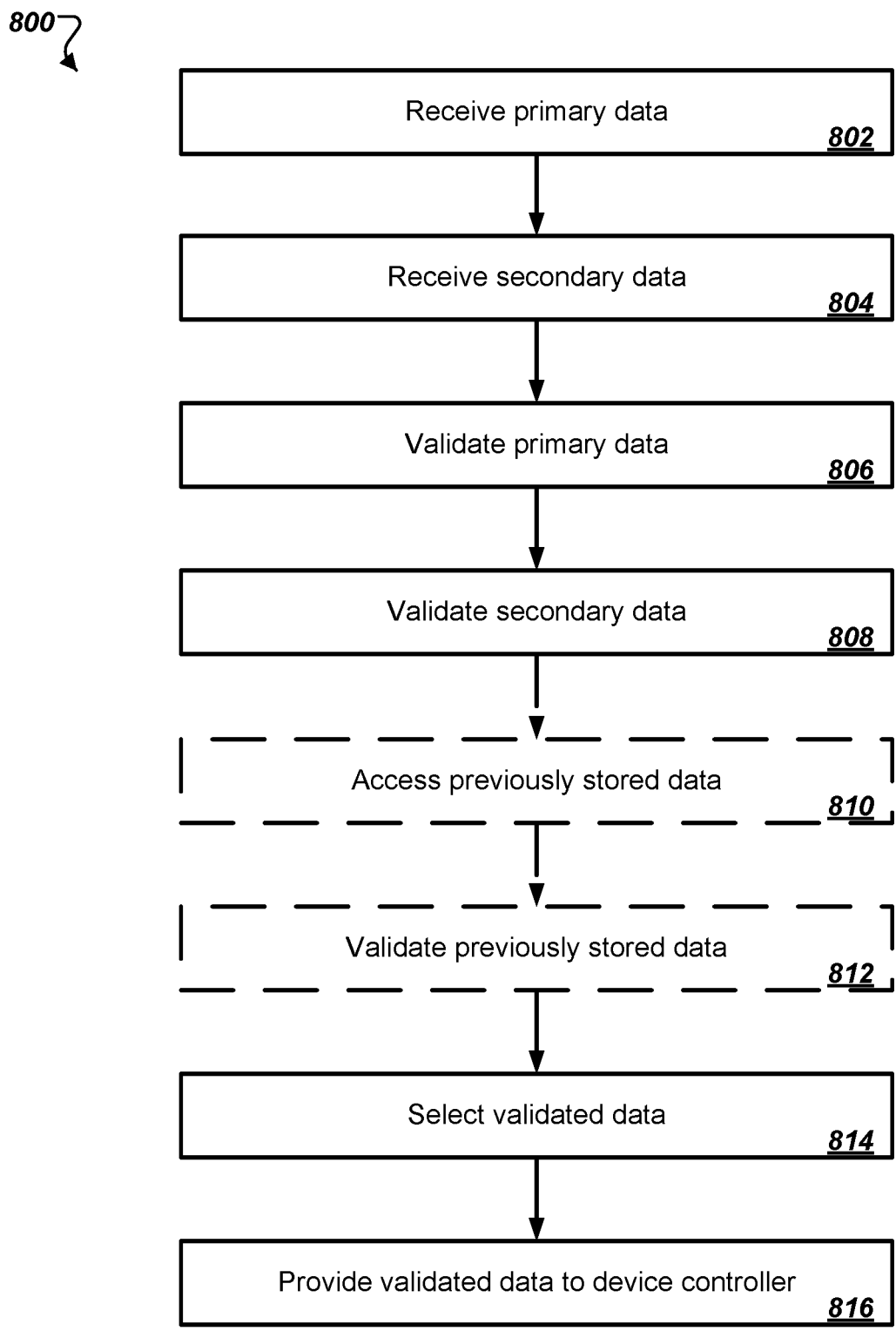
FIG. 8 shows a flowchart of an example of a process performed by an autonomous device safety architecture system.

The architecture may further include one or more particular stages in the invention that need feedback from lower stages. For example, if a trajectory-execution function fails, FIG. 8 is a flowchart of an example of a process 800 performed by an autonomous device safety architecture system. The process 800 may be performed by a system of one or more computers. The process 800 may include details that have been discussed above.

The system receives primary data for moving a device on a planned path (802). The system may include a primary safety gate that receives the primary data from a primary unit. The system also receives secondary data for moving the device in presence of one or more adverse conditions during the moving of the device on the planned path (804). The system may include a secondary safety gate that receives the secondary data from a secondary unit.

The system validates the primary data (806) by determining whether the primary data provides for the moving of the device on the planned path in a safe manner. The primary safety gate may execute an algorithm that makes this determination. The system also validates the secondary data (808) by determining whether the secondary data provides for the moving of the device so as to avoid the one or more adverse conditions. The secondary safety gate may execute an algorithm that makes this determination. If the system determines that the secondary data does not provide for the moving of the device so as to avoid the one or more adverse conditions, the system accesses previously stored data for the moving of the device in presence of the one or more adverse conditions (810) and validates the previously stored data by determining whether the previously stored data provides for the moving of the device so as to avoid the one or more adverse conditions (812).

The system selects the primary data, the secondary data, the previously stored data, or default data (814) based on evaluating logic data. The system may include a priority selector that evaluates the logic data to make a selection. The logic data specifies rules that define that which data is selected under specific conditions. The primary data is selected after determining that the primary data provides for the moving of the device on the planned path in the safe manner. The secondary data is selected after determining that (i) the primary data does not provide for the moving of the device on the planned path in the safe manner and (ii) the secondary data provides for the moving of the device so as to avoid the one or more adverse conditions. The previously stored data is selected after determining that (i) the primary data does not provide for the moving of the device on the planned path in the safe manner, (ii) the secondary data does not provide for the moving of the device so as to avoid the one or more adverse conditions, and (ii) the previously stored data provides for the moving of the device so as to avoid the one or more adverse conditions. The default data specifies a default action to be performed by the device. The default data is selected after determining that (i) the primary data does not provide for the moving of the device on the planned path in the safe manner, (ii) the secondary data does not provide for the moving of the device so as to avoid the one or more adverse conditions, (iii) and the previously stored data does not provide for the moving of the device so as to avoid the one or more adverse conditions.

The system provides the selected primary, secondary, previously stored, or default data to a controller that controls the movement of the device (816).

Use of this architecture may simplify and make achievable the implementation of a fail-operational autonomy system. Instead of requiring one or more versions of high-integrity autonomy algorithms, low integrity autonomy algorithms may be used (e.g., the "doer" modules do not have to work perfectly to achieve safety). Safety gate "checker" modules are used to ensure fail-silent behavior of each doer/checker pair. The safety gates do have to be developed to high integrity, but are in general simpler and minimize or eliminate difficult-to-validate advanced autonomy algorithms, making them easier to validate. Additionally, the checkers themselves can be fail silent. Fail operational system behavior is achieved by having two (or more) diverse sets of fail-silent doer/checker paired functional blocks in each architectural stage. No single component needs to be fail-operational, and only the checkers need to be high integrity.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the invention.

What is claimed is:

1. A safety architecture system for autonomous vehicles comprising:
    a first stage comprising:
        one or more data processing apparatus; and
        a non-transitory computer readable storage medium encoded with a computer program, the program comprising instructions that when executed by the one or more data processing apparatus cause the one or more data processing apparatus to perform operations comprising:
            generate primary data for performing normal system functionality for output by a primary planner;
            generate secondary data for performing alternative system functionality for output by a secondary planner;
        a primary safety gate coupled to the primary planner, with the primary safety gate providing the primary data as a primary output responsive to a determination of validity of the primary data; and
        a secondary safety gate coupled to the secondary planner, with the secondary safety gate providing the secondary data as a secondary output responsive to a determination of validity of the secondary data; and
    an output selector that is coupled to both the primary safety gate and the secondary safety gate of the first stage, with the output selector providing a system output responsive to the determinations of the validities of the primary data and the secondary data.

2. The system of claim 1, wherein the primary safety gate determines validity of the primary data responsive to a permissive envelope provided by the secondary safety gate.

3. The system of claim 1, further comprising:
    one or more additional stages comprising a second stage, wherein a primary data output of the second stage provides an input to the primary planner of the first stage, and a secondary data output of the second stage provides an input to the secondary planner of the first stage.

4. The system of claim 1, wherein the secondary safety gate determines whether the secondary data was received within a predefined time window to determine whether the secondary data is valid.

5. The system of claim 1, wherein the secondary safety gate comprises a buffer that stores the secondary data in response to the determination the validity of the secondary data.

6. The system of claim 1, wherein the secondary safety gate provides previously stored secondary data as the secondary output responsive to a determination of invalidity of the secondary data.

7. The system of claim 1, wherein the system output comprises control data for operating a vehicle.

8. A computer-implemented method for upholding strict safety requirements in a safety architecture for autonomous vehicles, the method being executed by one or more processors and comprising:
    generating primary data for performing normal system functionality;
    generating secondary data for performing alternative system functionality;
    providing the primary data as a primary output of a first stage responsive to determining validity of the primary data;
    providing the secondary data as a secondary output of the first stage responsive to determining validity of the secondary data; and
    providing, by the one or more processors, a system output responsive to determining the validities of the primary data and the secondary data, wherein the system output is provided by an output selector that is coupled to both a primary safety gate that provides the primary data and a secondary safety gate that provides the secondary data, wherein the primary safety gate and the secondary safety gate are of the first stage.

9. The method of claim 8, wherein determining the validity of the primary data is responsive to a permissive envelope.

10. The method of claim 8, wherein:
    generating the primary data comprises receiving a primary input via a primary data output of a second stage; and
    generating the secondary data comprises receiving a secondary input via a secondary data output of a second stage.

11. The method of claim 8, wherein determining the validity of the secondary data comprises determining that the secondary data was generated within a predefined time window.

12. The method of claim 8, further comprising storing the secondary data in response to determining the validity of the secondary data.

13. The method of claim 8, further comprising:
    providing previously stored secondary data as the secondary output of the first stage responsive to determining invalidity of the secondary data.

14. The method of claim 8, wherein the system output comprises control data for operating a vehicle.

15. A system comprising:
    a primary planner unit that generates primary path data for moving a device from a first location to a second location;
    a safing planner unit that generates safing path data for moving the device in presence of one or more adverse conditions during the moving of the device in accordance with the primary path data;
    a primary planner safety gate that receives the primary path data from the primary planner unit, determines whether the primary path data provides for the moving of the device in accordance with the primary path data in a safe manner, and provides the primary path data as a verified primary path output in response to a determination that the primary path data provides for the moving of the device in accordance with the primary path data in the safe manner;
    a safing planner safety gate that receives the safing path data from the safing planner unit, determines whether the safing path data provides for the moving of the device so as to avoid the one or more adverse conditions, and provides the safing path data as a verified safing path output in response to a determination that the safing path data provides for the moving of the device so as to avoid the one or more adverse conditions;
    a primary trajectory executor unit that receives the verified primary path output and generates primary trajectory data from a current waypoint of the device based on the verified primary path output;

a safing trajectory executor unit that receives the verified safing path output and generates safing trajectory data from a current waypoint of the device based on the verified safing path output;

a primary trajectory safety gate that receives the primary trajectory data from the primary trajectory executor unit, determines whether the primary trajectory data is consistent with a current state of the device, and provides the primary trajectory data as a verified primary trajectory output in response to a determination that the primary trajectory data is consistent with the current state of the device;

a safing trajectory safety gate that receives the safing trajectory data from the safing trajectory executor unit, determines whether the safing trajectory data is consistent with the current state of the device, and provides the safing trajectory data as a verified safing trajectory output in response to a determination that the safing trajectory data is consistent with the current state of the device; and a priority selector that is coupled to the primary trajectory safety gate to receive the verified primary trajectory output, to the safing trajectory safety gate to receive the verified safing trajectory output, and to a controller to provide control data, the priority selector provides as the control data one of: the verified primary trajectory output if the verified primary trajectory output is received, the verified safing trajectory output if only the verified safing trajectory output is received, or a default output if neither the verified primary trajectory output nor the verified safing trajectory output is received.

16. The system of claim 15, wherein:

the safing trajectory executor unit generates a permissive envelope that specifies a minimum acceleration rate, a maximum acceleration rate, a minimum deceleration rate, a maximum deceleration rate, a minimum curvature change rate, and a maximum curvature change rate; and the primary trajectory safety gate determines whether the primary trajectory data is within values specified by the permissive envelope to determine whether the primary trajectory data is consistent with a current state of the device, and provides the verified primary trajectory output in response to a determination that the primary trajectory data is within the values specified by the permissive envelope.

17. The system of claim 15, wherein the safing trajectory safety gate determines whether the safing trajectory data was received within a predefined time window to determine whether the safing trajectory data is consistent with the current state of the device.

18. The system of claim 15, wherein the safing trajectory safety gate comprises a buffer that stores the safing trajectory data in response to a determination that the safing trajectory data is consistent with the current state of the device.

19. The system of claim 15, wherein:

the safing trajectory safety gate, in response to a determination that the safing trajectory data is not consistent with the current state of the device, accesses previously stored safing trajectory data, determines whether the previously stored safing trajectory data is consistent with the current state of the device, and provides the previously stored safing trajectory data as the verified safing trajectory output in response to a determination that the previously stored safing trajectory data is consistent with the current state of the device.

20. The system of claim 15, wherein the device comprises a vehicle and the one or more adverse conditions comprises at least one of a condition that prohibits the moving of the vehicle in accordance with the primary path data or a failure of a component of the vehicle that makes the moving of the vehicle in accordance with the primary path data unachievable.

* * * * *

UNITED STATES PATENT AND TRADEMARK OFFICE
CERTIFICATE OF CORRECTION

PATENT NO. : 10,962,972 B2  
APPLICATION NO. : 16/068320  
DATED : March 30, 2021  
INVENTOR(S) : Philip Koopman et al.

Page 1 of 1

It is certified that error appears in the above-identified patent and that said Letters Patent is hereby corrected as shown below:

In the Claims

Column 22, Line 7, Claim 8, delete "providing, by the one or more processors," and insert -- providing --

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*